United States Patent
Faibish et al.

(10) Patent No.: US 8,805,951 B1
(45) Date of Patent: Aug. 12, 2014

(54) VIRTUAL MACHINES AND CLOUD STORAGE CACHING FOR CLOUD COMPUTING APPLICATIONS

(75) Inventors: Sorin Faibish, Newton, MA (US); Jeffrey M. Nick, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 705 days.

(21) Appl. No.: 13/022,946

(22) Filed: Feb. 8, 2011

(51) Int. Cl.
*G06F 15/167* (2006.01)

(52) U.S. Cl.
USPC .............................. 709/213; 718/1; 718/104

(58) Field of Classification Search
CPC .............................. G06F 9/5072; G06F 9/5077
USPC ....................................... 709/213; 718/1, 104
See application file for complete search history.

(56) References Cited

U.S. PATENT DOCUMENTS

| | | | |
|---|---|---|---|
| 6,735,601 B1 | 5/2004 | Subrahmanyam | |
| 7,149,846 B2 | 12/2006 | Hetrick | |
| 7,383,463 B2 | 6/2008 | Hayden et al. | |
| 7,428,636 B1 | 9/2008 | Waldspurger et al. | |
| 7,433,951 B1 | 10/2008 | Waldspurger | |
| 7,546,364 B2 | 6/2009 | Raman et al. | |
| 7,546,432 B2 | 6/2009 | Stacey et al. | |
| 7,631,155 B1 | 12/2009 | Bono et al. | |
| 7,653,832 B2 | 1/2010 | Faibish et al. | |
| 7,676,628 B1 | 3/2010 | Compton et al. | |
| 7,779,091 B2 | 8/2010 | Wilkinson et al. | |
| 7,843,907 B1 | 11/2010 | Abou-Emara et al. | |
| 7,873,619 B1 | 1/2011 | Faibish et al. | |
| 7,890,754 B2 | 2/2011 | Waldspurger et al. | |
| 7,895,437 B2 | 2/2011 | Ganesan et al. | |
| 7,934,017 B2 | 4/2011 | Wilkinson | |
| 7,941,470 B2 | 5/2011 | Le et al. | |
| 7,953,819 B2 | 5/2011 | Liang et al. | |
| 7,971,047 B1 | 6/2011 | Vlaovic et al. | |
| 8,010,701 B2 | 8/2011 | Wilkinson et al. | |
| 8,019,873 B2 * | 9/2011 | Pairault et al. | 709/226 |
| 8,060,877 B1 | 11/2011 | Waldspurger et al. | |
| 8,352,941 B1 * | 1/2013 | Protopopov et al. | 718/1 |
| 8,413,141 B2 * | 4/2013 | Branson et al. | 718/1 |
| 8,429,140 B1 * | 4/2013 | Lolayekar et al. | 707/694 |
| 8,510,499 B1 * | 8/2013 | Banerjee | 711/103 |

(Continued)

OTHER PUBLICATIONS

"Cloud Computing," Wikipedia, Dec. 1, 2010, 15 pages, Wikimedia Foundation, Inc., San Francisco, CA.

(Continued)

*Primary Examiner* — Joseph E Avellino
*Assistant Examiner* — James Conaway
(74) *Attorney, Agent, or Firm* — Krishnendu Gupta; Deepika Bhayana

(57) ABSTRACT

An application is included in a virtual machine sent to a cloud computing server. The cloud computing server has a remote access layer that fetches data blocks of the private dataset of the application from private data storage as the data blocks are requested by the application, so that the application in the public cloud begins execution without waiting for the entire application dataset to be transferred to the public cloud, and the data blocks are transferred from the private dataset to the public cloud only when the data blocks are accessed by the application. The application's private data is kept in the public cloud only when it is currently being used. If there are security concerns, the application's private data is transferred over the public network in an encrypted form and stored in the public cloud in an encrypted form.

17 Claims, 13 Drawing Sheets

(56) References Cited

U.S. PATENT DOCUMENTS

| | | | |
|---|---|---|---|
| 8,516,480 B1* | 8/2013 | Epstein et al. | 718/1 |
| 2006/0184937 A1* | 8/2006 | Abels et al. | 718/1 |
| 2007/0094445 A1 | 4/2007 | Trika et al. | |
| 2008/0147745 A1* | 6/2008 | Wilkinson et al. | 707/200 |
| 2008/0177954 A1 | 7/2008 | Lee | |
| 2009/0210875 A1* | 8/2009 | Bolles et al. | 718/1 |
| 2010/0325199 A1* | 12/2010 | Park et al. | 709/203 |
| 2011/0184993 A1* | 7/2011 | Chawla et al. | 707/802 |
| 2012/0005673 A1* | 1/2012 | Cervantes et al. | 718/1 |
| 2012/0109958 A1* | 5/2012 | Thakur et al. | 707/737 |
| 2013/0275375 A1* | 10/2013 | Nickolov et al. | 707/636 |

OTHER PUBLICATIONS

The LAM/MPI Team, "LAM/MPI User's Guide," Jul. 24, 2007, 129 pages, Pervasive Technology Labs, Indiana University, Bloomington, IN.

"VMotion Over Distance for Microsoft, Oracle, and SAP," White Paper, May 2010, 56 pages, EMC Corporation, Hopkinton, MA.

"EMC VPLEX Local," Specification Sheet, Apr. 2010, 2 pages, EMC Corporation, Hopkinton, MA.

"Workload Resiliency with EMC VPLEX," May 2010, 19 pages, EMC Corporation, Hopkinton, MA.

Mearian, Lucas, "EMC announces VPLEX private-cloud appliance," Computerworld, May 10, 2010, 5 pages, Computerworld Inc., Framingham, MA.

"Multiprocessing MPI Batch Jobs," BU Information Services and Technology, Dec. 29, 2010, 2 pages, Boston University, Boston, MA.

"Virtual Machine Disk Format (VMDK)," 2010, 1 page, VMware, Palo Alto, CA.

"WMware ESX," Wikipedia, Dec. 28, 2010, 8 pages, Wikimedia Foundation, Inc., San Francisco, CA.

Ganeshan, Bala, and McGhee, Mike, "VMware ESX Server 1.X and 2.X Using EMC Symmetrix Storage Systems," Version 1.1, EMC Corporation, 2006, 152 pages, EMC Corporation, Hopkinton, MA.

"VMware and Cloud Computing, An Evolutionary Approach to an IT Revolution," 2010, 20 pages, VMware, Palo Alto, CA.

"VMware ESX and VMware ESXi," The Market Leading Production-Proven Hypervisors, 2009, 6 pages, VMware, Palo Alto, CA.

"VMware Virtualization and Cloud Management," 2010, 4 pages, VMware, Palo Alto, CA.

Virtual Disk Format 5.0, Technical Note, Dec. 20, 2011, 14 pages, VMware, Inc., Palo Alto, CA.

Virtual Hard Disk Image Format Specification, Version 1.0, Oct. 11, 2006, 17 pages, Microsoft Corporation, Redmond, WA.

Satran et al., Internet Small Computer Systems Interface (iSCSI), Network Working Group, Request for Comments: 3720, Apr. 2004, 257 pages, The Internet Society, Reston, VA.

Small Computer System Interface (SCSI), SCSI_STANDARD_s1-r17b, Dec. 16, 1985, 190 pages, Computer and Business Equipment Manufacturers Association, U.S. Department of Commerce, National Bureau of Standards, Gaithersburg, MD.

Freier et al., The SSL Protocol Version 3.0, Nov. 18, 1996, 65 pages, The Internet Society, Reston, VA.

VMware Introduces Open Virtual Machine Disk Format Specification, WMware News Release, Apr. 3, 2006, 7 pages, VMware, Inc., Palo Alto, CA.

Getting Started with VMware Fusion—VMware Fusion for Mac OS X, 2012, 16 pages, VMware, Inc., Palo Alto, CA.

Metz, Joachim, VMware Virtual Disk (VMDK) format specification, Analysis of the VMware Virtual Disk (VMDK) format, Oct. 2013, 21 pages, Zurich, Switzerland.

* cited by examiner

| CACHE STATE | | CLOUD STORAGE CACHE STATE OF THE CACHE BLOCk |
|---|---|---|
| MSB | MSB-1 | |
| 0 | 0 | BLOCK INVALID |
| 0 | 1 | BLOCK VALID AND CLEAN |
| 1 | 0 | BLOCK VALID AND DIRTY AND NOT BEING WRITTEN BACK |
| 1 | 1 | BLOCK VALID AND DIRTY AND BEING WRITTEN BACK |

VIRTUAL MACHINES AND CLOUD STORAGE CACHING FOR CLOUD COMPUTING APPLICATIONS

FIELD OF THE INVENTION

The present invention relates generally to virtual storage and virtual machines in a cloud computing environment. The present invention more particularly relates to storage caching of datasets used by cloud computing applications.

BACKGROUND OF THE INVENTION

Storage virtualization is a technique of providing virtual storage to applications in such a way that the virtual storage is backed by physical storage that is hidden from the applications. See, for example, Bono, et al. U.S. Pat. No. 7,631,155 issued Dec. 8, 2009, entitled "Thin provisioning of a file system and an iSCSI LUN through a common mechanism." A storage virtualization appliance can dynamically allocate physical storage to a virtual storage volume when an application actually needs to store data in the virtual storage volume. In addition, the storage virtualization appliance can dynamically migrate or mirror application data between physical storage devices in a way that is hidden from the applications. For example, the EMC Corporation VPLEX METRO brand of storage virtualization appliance provides virtual storage backed by storage area network-based (SAN) block storage in order to allow the physical storage provided by traditional storage arrays to be virtualized, accessed, and managed across boundaries between data centers.

A virtual machine encapsulates an entire server or desktop computer environment so that multiple virtual machines can be hosted in a single network server in such a way that the environment of the network server is hidden from applications executed on the virtual machine. Typically this is done by installing a virtualization layer on the network server and then layering the virtual machines over the virtualization layer. The virtualization layer abstracts and allocates processor, memory, storage, and networking resources to each virtual machine. The virtualization layer also isolates the virtual machines from each other so that a crash or configuration error in one virtual machine does not affect the other virtual machines.

Each virtual machine, for example, is a software appliance encapsulated in a file in accordance with a standard Virtual Machine Disk Format (VMDK). In general, a software appliance is a full application stack containing an operating system, application software, and any configuration and data files required to operate the application software and the operating system. The encapsulation of a virtual machine in a file permits the virtual machine to be migrated from one network server to another in a file migration process. See, for example, John Hayden et al., U.S. Pat. No. 7,383,463 issued Jun. 3, 2008, entitled "Internet protocol based disaster recovery of a server."

Cloud computing is Internet-based computing, whereby shared server resources, software, and information are provided to client devices on demand. The server resources, for example, include data storage, processing capabilities, and network bandwidth. The resources are often scalable and virtualized, so that details of resource provisioning are hidden from the cloud computing consumers, who no longer have need for expertise in, or control over, the technology that provides the shared server resources.

Cloud application platforms provide facilities for transitioning legacy applications to cloud computing infrastructures, and providing security, control and compliance over the applications and data in the cloud computing infrastructures. For example, the VMware Inc., VSPHERE brand of cloud application platform provides facilities for creating multi-tenant virtual datacenters that are decoupled from the underlying hardware and isolated from one another. The virtual datacenters are exposed to users through a Web-based portal and the users are provided with a catalog of Information Technology (IT) services that can be deployed within the virtual datacenter. Applications and data can be segmented into trusted zones and security policies can be implemented and monitored for IT compliance.

Private clouds emulate cloud computing on private networks by hosting virtual machines on servers in the private networks. The private clouds provide the benefits of sharing hardware costs for utility computing, the ability to recover from failure, and the ability to scale up or down depending upon demand. Private cloud users, however, still have to buy, build, and manage the private networks, and therefore the private cloud users do not achieve the public cloud benefits of lower up-front capital costs and less hands-on management of the IT infrastructure.

SUMMARY OF THE INVENTION

It has been discovered that the conventional public cloud computing infrastructure can be improved substantially for users that already have private storage for storing datasets used by the cloud applications. For example, when a legacy application is transitioned to the conventional public cloud computing infrastructure, the datasets used by the application must also be transitioned to the public cloud computing infrastructure before the application is executed in the public cloud. Thus, execution of the application in the public cloud must wait until the transfer of its datasets has been completed. Moreover, in many cases the application does not need a complete copy of its datasets in the public cloud in order to process its datasets efficiently. In these cases, maintaining a complete copy of the datasets in the public cloud would waste cloud storage resources, waste cloud bandwidth resources in transferring data that is not accessed by the application, and increase the risk of public exposure of sensitive private data that is not accessed by the legacy application.

In accordance with one aspect, the invention provides a method of executing an application program in a public cloud network without moving a private dataset of the application program from private data storage to the public cloud network. The method includes a data processor of a cloud computing server in the public cloud network executing computer instructions stored on a non-transitory computer readable storage medium of the cloud computing server to perform the steps of: (a) loading a virtual machine onto the non-transitory computer readable storage medium, the virtual machine including the application program, and the non-transitory computer readable storage medium also storing a cloud computing storage remote access program layer for remote access over the public cloud network to the private dataset; and (b) executing the application program with the data processor to access data blocks of the private dataset by invoking the cloud computing remote access layer, and in response to the execution of the application program invoking the cloud computing remote access layer, executing the cloud computing remote access layer to fetch the data blocks from the private dataset by remote access over the public cloud network to the private dataset, so that the execution of the application program with the data processor accesses the data blocks of the private dataset without waiting for the entire application dataset to be transferred to the public cloud network, and the data blocks of the private dataset are transferred from the private dataset to the cloud computing server only when the data blocks of the private dataset are accessed by the execution of the application program.

In accordance with another aspect, the invention provides a data processing system including a cloud computing server. The cloud computing server includes a data processor, a network adapter for linking the data processor to a public cloud network for remote access to private data storage remote from the cloud computing server, and a non-transitory computer readable storage medium coupled to the data processor for execution of computer instructions stored on the non-transitory computer readable storage medium. The computer instructions, when executed by the data processor, perform a method of executing an application program in the cloud computing server without moving a private dataset of the application program from the private data storage to the public cloud network. The method includes the steps of: (a) loading a virtual machine onto the non-transitory computer readable storage medium, the virtual machine including the application program, and the non-transitory computer readable storage medium also storing a cloud computing storage remote access program layer for remote access over the public cloud network to the private dataset; and (b) executing the application program with the data processor to access data blocks of the private dataset by invoking the cloud computing remote access layer, and in response to the execution of the application program invoking the cloud computing remote access layer, executing the cloud computing remote access layer to fetch the data blocks from the private dataset by remote access over the public cloud network to the private dataset, so that the execution of the application program with the data processor accesses the data blocks of the private dataset without waiting for the entire application dataset to be transferred to the public cloud network, and the data blocks of the private dataset are transferred from the private dataset to the cloud computing server only when the data blocks of the private dataset are accessed by the execution of the application program.

In accordance with a final aspect, the invention provides a non-transitory computer readable storage medium storing computer instructions that, when executed by a data processor of a cloud computing server in a public cloud network, perform a method of executing an application program in the cloud computing server without moving a private dataset of the application program from private data storage to the public cloud network. The method includes the steps of: (a) loading a virtual machine onto the non-transitory computer readable storage medium, the virtual machine including the application program, and the non-transitory computer readable storage medium also storing a cloud computing storage remote access program layer for remote access over the public cloud network to the private dataset; and (b) executing the application program with the data processor to access data blocks of the private dataset by invoking the cloud computing remote access layer, and in response to the execution of the application program invoking the cloud computing remote access layer, executing the cloud computing remote access layer to fetch the data blocks from the private dataset by remote access over the public cloud network to the private dataset, so that the execution of the application program with the data processor accesses the data blocks of the private dataset without waiting for the entire application dataset to be transferred to the public cloud network, and the data blocks of the private dataset are transferred from the private dataset to the cloud computing server only when the data blocks of the private dataset are accessed by the execution of the application program.

BRIEF DESCRIPTION OF THE DRAWINGS

Additional features and advantages of the invention will be described below with reference to the drawings, in which.

Figure 1:
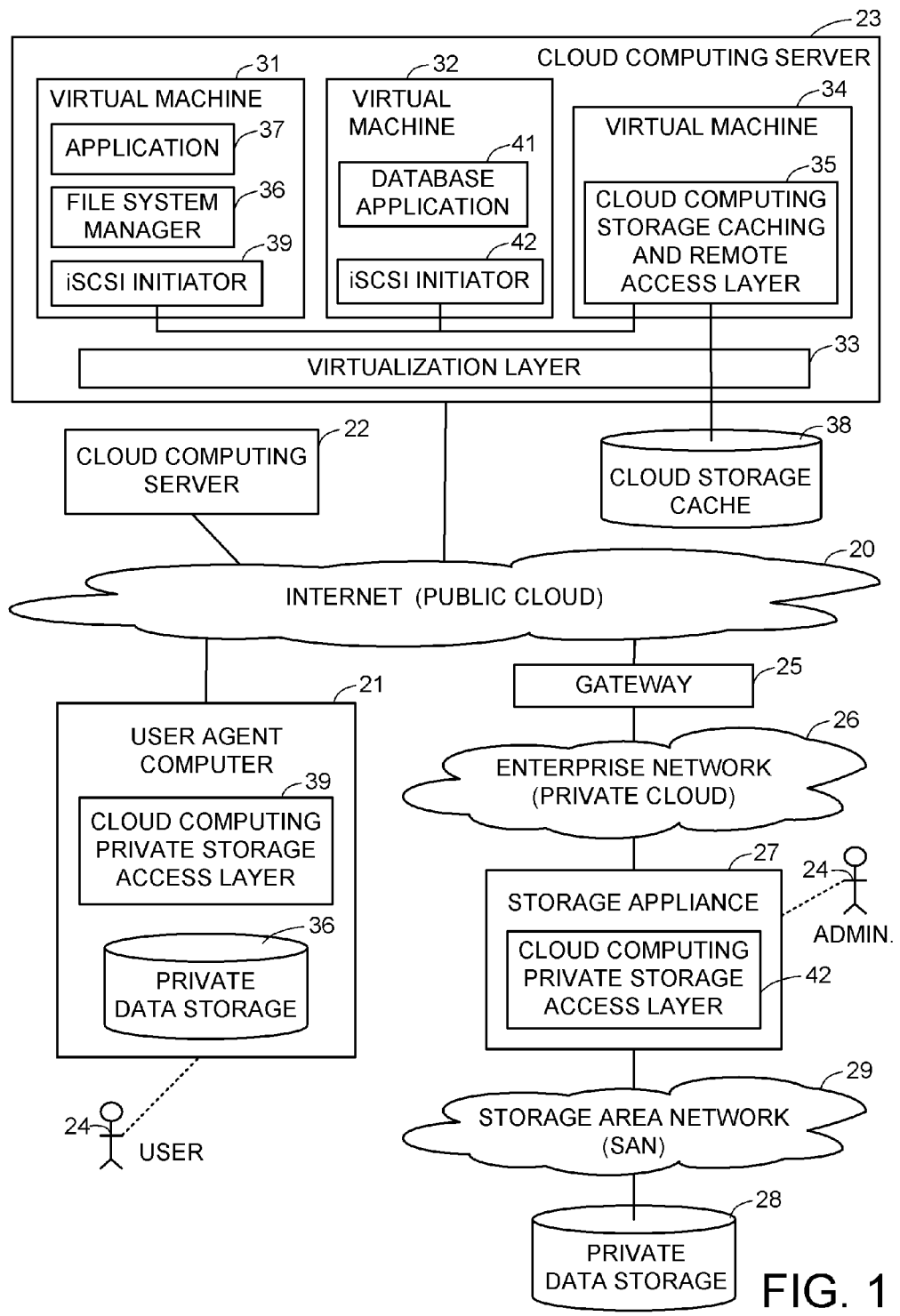
FIG. 1 is block diagram of a cloud computing environment on the Internet.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a cloud computing environment on the Internet 20. In general, the Internet 20 links user agent computers, such as a user agent computer 21, to server computers, such as cloud computing servers 22 and 23. A human user 24, for example, may operate the user agent computer 21 to request access to a resource stored on one of the servers 22 and 23.

Because the Internet is open and supplies services to anyone, it is called a "public cloud." In contrast, a network that is closed and supplies limited services to a limited number of people is called a "private cloud." In FIG. 1, for example, a gateway server 25 couples an enterprise network 26 to the Internet 20. The enterprise network 26 is a private cloud that services an enterprise such as a corporation or governmental agency. The enterprise network 26, for example, includes a storage appliance 27 for managing datasets stored in private data storage 28. The private data storage 28, for example, is an array of disk drives linked to the storage appliance 27 via a storage area network (SAN) 29.

The Internet 20 has been used for many years to supply human users operating user agent computers with access to web pages, electronic mail, and file downloads from web servers at Internet sites. More recently web servers at Internet sites have been offering "cloud storage" and "cloud computing" services. A "cloud storage" service permits a user to upload and store files at a remote Internet site, and later retrieve and download the files. A "cloud computing" service permits a user to upload an application program and application datasets to a remote Internet site, and then upload job requests for execution of the application program, and later download results of the execution of the application program.

As shown in FIG. 1, a cloud computing server 23 is programmed to provide a number of virtual machines 31, 32, so that each virtual machine is allocated to one Internet user requesting cloud computing services. Each virtual machine 31, 32 provides the user with a separate computer environment. The virtual machines 31, 32 are layered over a virtualization layer 33 that abstracts and allocates processor, memory, storage, and networking resources to each virtual machine. The virtualization layer 33 also isolates the virtual machines 31, 32 from each other so that a crash or configuration error in one virtual machine does not affect the other virtual machines.

It has been discovered that the conventional public cloud computing infrastructure can be improved substantially for users that already have private storage for storing datasets used by the cloud applications. For example, when a legacy application is transitioned to the conventional public cloud computing infrastructure, the datasets used by the application must also be transitioned to the public cloud computing infrastructure before the application is executed in the public cloud. Thus, execution of the application in the public cloud must wait until the transfer of its datasets has been completed. Moreover, in many cases the application does not need a complete copy of its datasets in the public cloud in order to process its datasets efficiently. In these cases, maintaining a complete copy of the datasets in the public cloud would waste cloud storage resources, waste cloud bandwidth resources in transferring data that is not accessed by the application, and increase the risk of public exposure of sensitive private data that is not accessed by the legacy application.

To solve these problems, a storage virtualization appliance 34 for public cloud computing of an application provides access during execution of the application to a dataset of the application by public cloud storage 38 of an incomplete copy of the dataset. When execution of the application reads data that is not presently included in the incomplete copy of the dataset, then the data is fetched from private storage and stored in the public cloud storage 38. Thus, the public cloud storage 38 is managed as a cloud storage cache. In this fashion, data is kept in the cloud storage cache 38 only when it will facilitate execution of the application in the public cloud without an unwarranted risk of public exposure of sensitive private data.

As shown in FIG. 1, the cloud computing server 23 is programmed to include such a storage virtualization appliance 34. The storage virtualization appliance 34 is a virtual machine including a cloud computing storage caching and remote access layer 35. The virtualization layer 33 allocates cloud cache storage 38 to the virtual machine 31.

For example, the user agent computer 21 includes a hard disk drive 36 providing private data storage for the user 24. When the user 24 would like to use the cloud computing services of the cloud computing server 23, the user 24 uploads an application 37 to the cloud computing server 23, and the application 37 is included in the virtual machine 31 allocated to the user 24.

The virtual machine 31 also includes a file system manager 36 and an Internet Small Computer Systems Interface (iSCSI) initiator 39. The cloud computing storage caching and remote access layer 35 is layered below the iSCSI initiator 39 and above the virtualization layer 33, so that the cloud computing storage caching and remote access layer 35 intercepts iSCSI commands from the iSCSI initiator. Therefore the virtual machine 34 provides a virtual storage area network (SAN) to the other virtual machines 31 and 32 in the cloud computing server 23. In this example, iSCSI is the preferred protocol for access to the virtual SAN, although other protocols, such as Small Computer Systems Interface (SCSI) or Fibre Channel (FC), could be used for access to the virtual SAN.

In the virtual machine 31, the data sets of the application 37 are files. To access a file, the application 37 sends a file access request to the file system manager 36. To service the file access request, the file system manager 36 accesses SCSI device blocks that contain data or metadata of the file. The file system manager 36 accesses the SCSI device blocks by invoking the iSCSI initiator to send iSCSI requests to the virtual machine 34. In the virtual machine 34, the storage caching and remote access layer 35 looks up the requested SCSI device blocks in the cloud storage cache 38.

When a requested SCSI device block is not found in the cloud storage cache 38, the cloud computing storage caching and remote access layer 35 sends an SCSI request for remote SCSI device block access to the user agent computer 21. This request is recognized by a cloud computing private storage access layer 39 in the user agent computer 21. The cloud computing private storage access layer 39 then reads the requested SCSI device block from the private data storage 36 and returns a copy of the requested SCSI device block to the cloud computing storage caching and remote access layer 35. Upon receipt of the copy of the requested SCSI device block, the cloud computing storage caching and remote access layer 35 returns the copy of the requested SCSI device block to the application 37 and also stores a copy of the requested SCSI device block in the cloud storage cache 38.

The virtual machine 34 including the cloud computing storage caching and remote access layer 35 is layered over the virtualization layer 33 so that the storage accessed by the cloud computing storage caching and remote access layer 35 could be distributed anywhere in the public cloud 20 or in any user agent computer or enterprise network linked to the public cloud. For example, the private storage accessible to the virtual machine 34 through the cloud computing storage caching and remote access layer 35 could be a combination of private storage in multiple user agent computers.

In a similar fashion, the cloud computing server 23 may provide cloud computing services to the enterprise owning the enterprise network 26. For example, a database application 41 in the virtual machine 32 operates upon datasets in the private data storage 28, and the storage appliance 27 is programmed with a cloud computing private storage access layer 42 permitting the cloud computing storage caching and remote access layer 35 of the virtual machine 34 to access the application datasets in the private data storage 28. In this case, the database application 41 requests SCSI device blocks from an iSCSI initiator 42, and the iSCSI initiator 42 sends iSCSI commands to the virtual machine 34. These iSCSI commands are intercepted by the cloud computing storage caching and remote access layer 35, which obtains copies of the requested SCSI device blocks from the cloud storage cache 38 or else from the private data storage 28.

For example, the private data storage 28 contains a database of respective deoxyribonucleic acid (DNA) signatures of individuals, and the database application 41 is a search engine from Oracle Corporation for searching for a DNA signature matching certain nucleotide sequences from crime scene evidence. For such an application, it is essential to maintain the confidentiality of the database, yet it may be necessary to search the entire database. In the public cloud 20 of FIG. 1, the data blocks of the DNA database would be transferred from the private data storage 28 to the cloud computing server 23, but these data blocks would only be comprehensible to the database application 41. Only separate data blocks are transferred in a way that is uncorrelated with the random access memory locations in the cloud computing server 23 and uncorrelated with the cache blocks in the cloud storage cache 38. Moreover, for searching a large database, different portions of the data base are searched in different cloud computing servers. Therefore, only a small percentage of a large private database is ever copied to any one cloud computing server.

After the virtual machine 32 is deleted at the end of a job, the meaning of any copies of these data blocks left in the cloud storage cache 38 would be meaningless since they would be a jumble of DNA fragments. Without a history of execution of the application, the jumble of DNA fragments could not be reassembled into any of the DNA signatures in the DNA database. The cache block addresses of the copies in the cloud storage cache 38 are not correlated with the data block addresses in the private data storage. Without application knowledge of each block, it is impossible to reconstruct the ordering of the original data blocks in private storage from the ordering of the cache blocks in the cloud storage cache 38 because the ordering is time dependent upon when the application requested each block and upon the availability at this time of free cache blocks in the cloud storage cache.

For some other applications, it might be possible to glean some useful information from copies of individual data blocks in the cloud storage cache 38. Therefore, at the end of a job, any copies of data blocks in the cloud storage cache 38 are deleted. If critical information can be gleaned from copies of the individual data blocks, then the data blocks are encrypted during transmission through the public cloud and also encrypted in random access memory cache of the could computing server 23 and in the cloud storage ache 38. The encryption may use a temporary key. For encryption during transmission, temporary keys need be known only by the cloud computing private storage access layer 42 and by the cloud computing storage caching and remote access layer 35. For encryption in the random access memory cache of the cloud computing server 23 or in the cloud computing cache 38, a local temporary key may be used that need only be known by the application 41. In addition, the virtual machine 35 of the cloud computing storage caching and remote access layer also can be deleted at the end of the job so that there will be no trace in the public cloud of any copies of data blocks from the private storage 28 or any results of the job.

Figure 2:
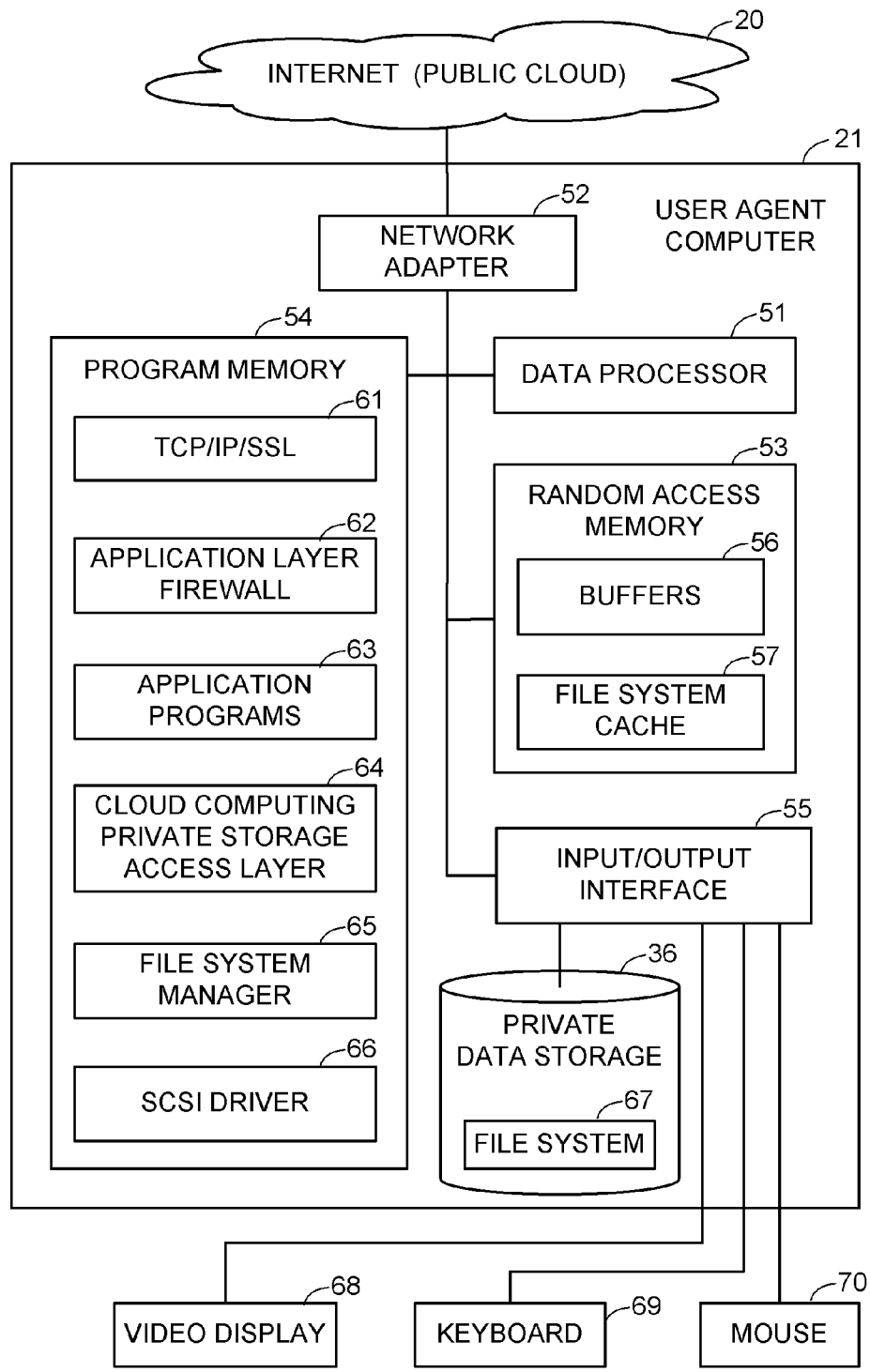
FIG. 2 is a block diagram of a user agent computer introduced in FIG. 1.

FIG. 2 shows further details of the user agent computer 21 introduced in FIG. 1. The user agent computer 21 includes a data processor 51, a network adapter 52 for linking the data processor to the Internet 20, random access memory 53, a program memory 54, and an input/output interface 55. The data processor 51 is a general purpose digital computer data processor including one or more core central processing units (CPUs) for executing computer program instructions stored in the program memory 54. The random access memory 53 includes buffers 56 and a file system cache 57.

The program memory 54 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

The program memory 54 includes a program layer 61 for communication over the Internet using the Transmission Control Protocol (TCP) over the Internet Protocol (IP) and Secure Socket Layer (SSL) for secure data transmission. The program memory 54 also includes an application layer firewall 62 for limiting remote Internet access to the user agent computer 21. The program memory 54 further includes application programs 63, a cloud computing private storage access layer 64, a file system manager 65, and a Small Computer Systems Interface (SCSI) driver 66. The file system manager 65 provides access to a file system 67 in the private data storage 36, and also maintains the file system cache 57 in the random access memory 53.

The input/output interface 55 interconnects the data processor 51 to the hard drive 36 providing the private data storage, and to input/output devices such a video display 68, a keyboard 69, and a computer mouse 70.

Figure 3:
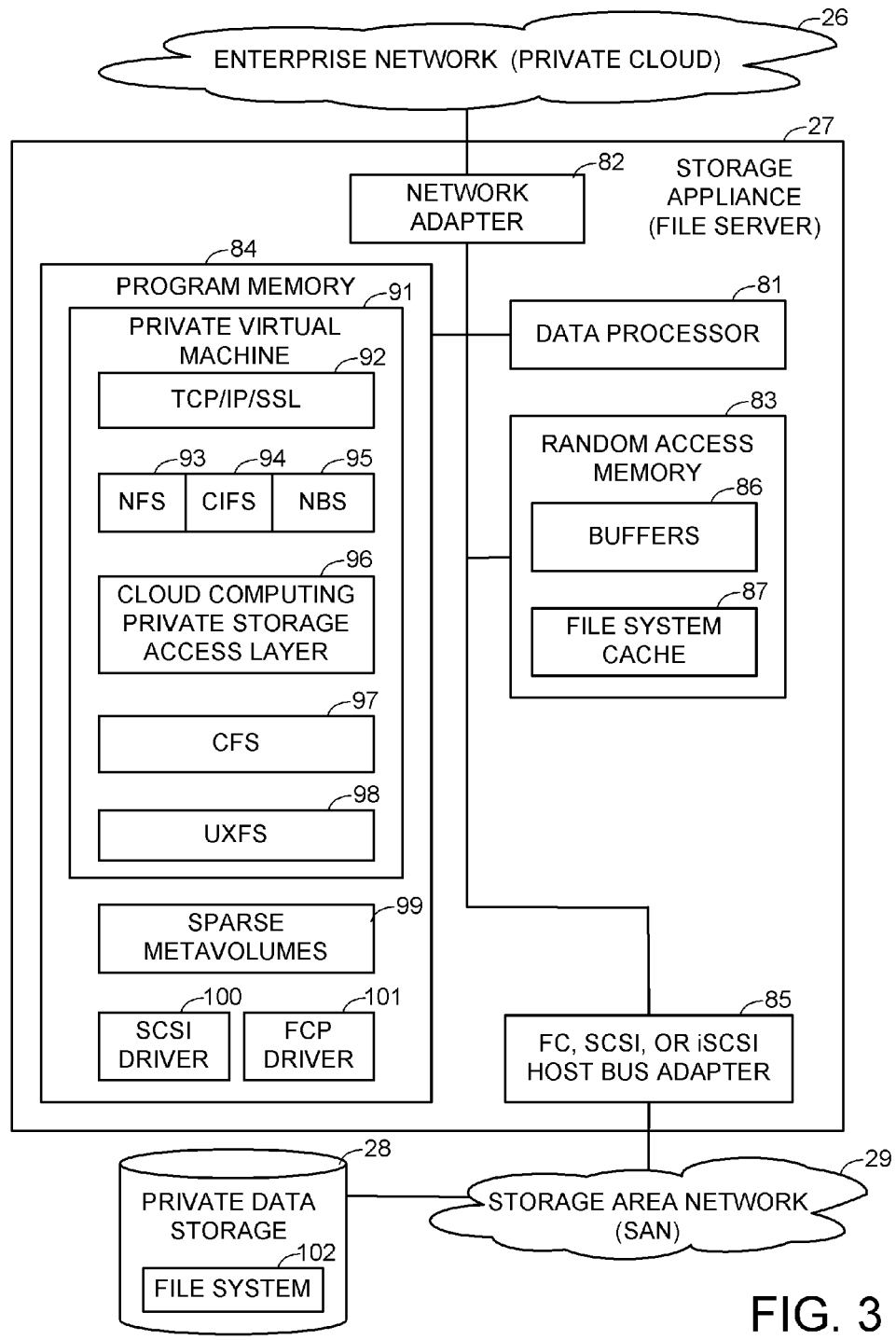
FIG. 3 is a block diagram of a file server used as a storage appliance in FIG. 1.

FIG. 3 shows further details of the storage appliance 27. In this example, the storage appliance 27 is a multi-protocol network file server. The storage appliance includes a data processor 81, a network adapter 82 linking the data processor to the enterprise network 26, random access memory 83, program memory 84, and a Fibre-Channel (FC), Small Computer Systems Interface (SCSI), or Internet Protocol SCSI (iSCSI) host bus adapter 85 linking the data processor to the storage area network (SAN) 29. The data processor 81 is a general purpose digital computer data processor including one or more core central processing units (CPUs) for executing computer program instructions stored in the program memory 84. The program memory 84 is a non-transitory computer readable storage medium, such as electrically erasable and programmable read-only memory (EEPROM). The random access memory 83 includes buffers 86 and a file system cache 87.

The program memory 84 includes a private virtual machine 91 for servicing file access and block access requests from the enterprise network 26. The private virtual machine 91 includes a program layer 92 for network communication using TCP/IP and SSL. The private virtual machine 91 also has a Network File System (NFS) module 92 for supporting file access requests using the NFS file access protocol, a Common Internet File System (CIFS) module 94 for supporting file access requests using the CIFS file access protocol, an a Network Block Services (NBS) module 95 for supporting iSCSI access to virtual LUNs configured from the private data storage 28. The private virtual machine 91 also has a cloud computing private storage access layer 96 for responding to storage access requests from a cloud computing storage caching and remote access layer in a cloud computing server in the Internet.

The NFS module 93, the CIFS module 94, the NBS module 95, and the cloud computing private storage access layer 96 are layered over a Common File System (CFS) module 97. The CFS module 97 is layered over a Universal File System (UxFS) module 98. The UxFS module 98 supports a UNIXbased file system, and the CFS module 97 provides higher-level functions common to NFS and CIFS. For example, the UxFS module 98 maintains a file system 102 in the private data storage 28, and maintains the file system cache 87 in the random access memory 83.

The program memory 84 further includes a sparse metavolumes layer 99 providing a free mapping from slices of the logical extents of one or more metavolumes to configured slices of storage, such as LUNs of storage, in the storage area network (SAN) 29. The sparse metavolumes layer 99 is layered over a SCSI driver 100 and a Fibre-Channel protocol (FCP) driver 101 in order to access the configured slices of logical storage in the storage area network (SAN) 29. The data processor 81 sends storage access requests through the host bus adapter 85 using the SCSI protocol, the iSCSI protocol, or the Fibre-Channel protocol, depending on the particular protocol used by the storage area network (SAN) 29.

Figure 4:
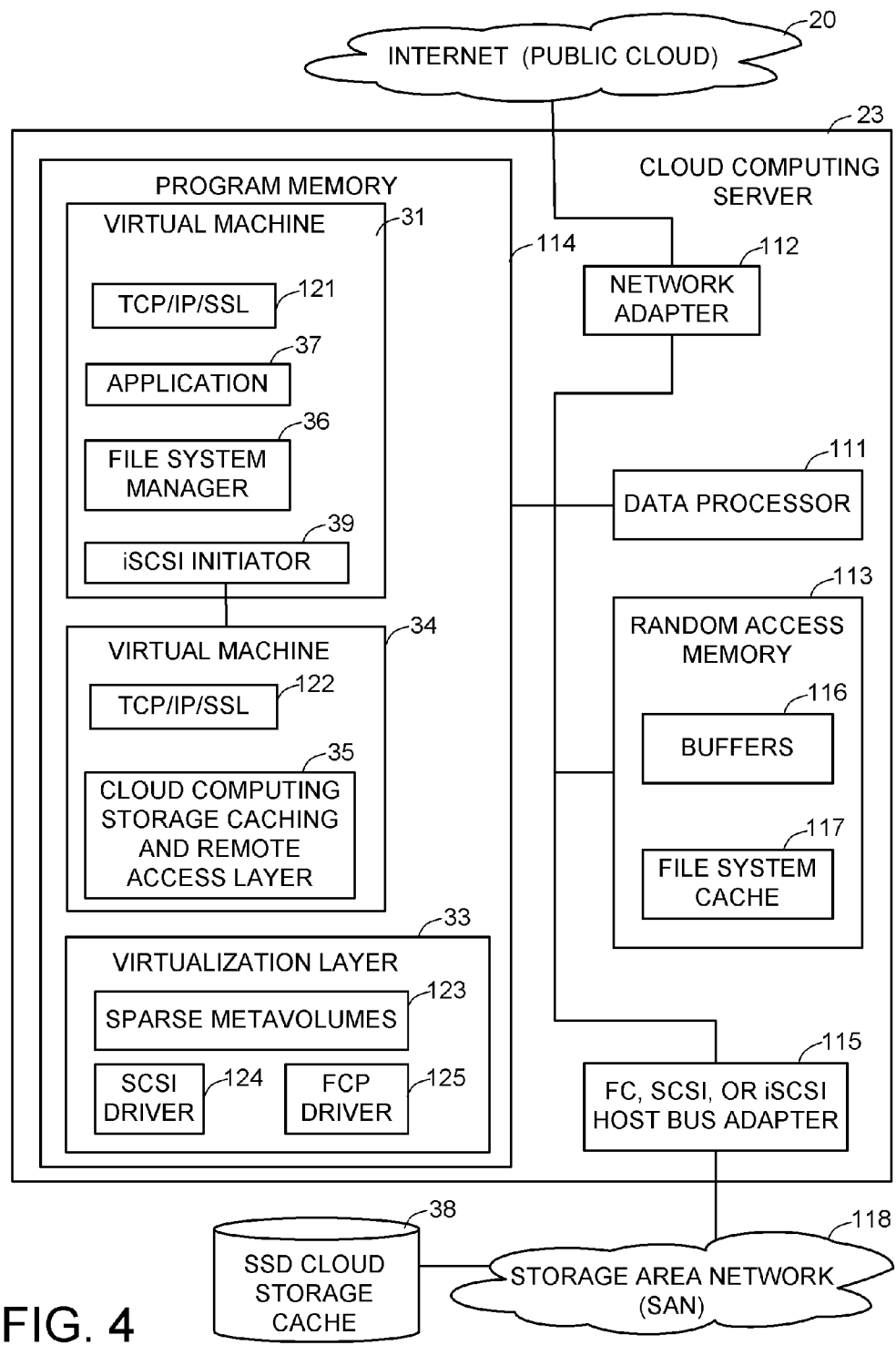
FIG. 4 is a block diagram of a cloud computing server introduced in FIG. 1.

FIG. 4 shows further details of the cloud computing server 23 introduced in FIG. 1. In this example, the cloud computing server 23 has components similar to those found in the network file server of FIG. 3, such as a data processor 111, a network adapter 112 linking the data processor to the Internet 20, a random access memory 113, a program memory 114, and a FC, SCSI, or iSCSI host bus adapter 115. The data processor 111 is a general purpose digital computer data processor including one or more core central processing units (CPUs) for executing computer program instructions stored in the program memory 114. The program memory 114 is a non-transitory computer readable storage medium, such as electrically erasable and programmable read-only memory (EEPROM). The random access memory 113 includes buffers 116 and a file system cache 117. A storage area network (SAN) 118 links the host bus adapter 115 to the cloud storage cache 38. In this example, solid-state disk storage (SSD) is the kind of storage used for the cloud storage cache 38. The use of SSD in the cloud storage cache 38 provides fast access to temporary data to accelerate execution of the cloud computing jobs.

The virtual machine 31 includes the application 37 for cloud computing, a network communication layer 121 supporting communication using TCP/IP and SSL, the file system manager 36, and the iSCSI initiator 39. The file system manager 36 maintains the file system cache 117 in the random access memory 113.

The virtual machine 34 includes the cloud computing storage caching and remote access layer 35. The virtual machine 34 also includes a network communication layer 122 supporting communication using TCP/IP and SSL.

The virtualization layer 33 includes a sparse metavolumes layer 123 over a SCSI driver 124, and a FCP driver 125.

Figure 5:
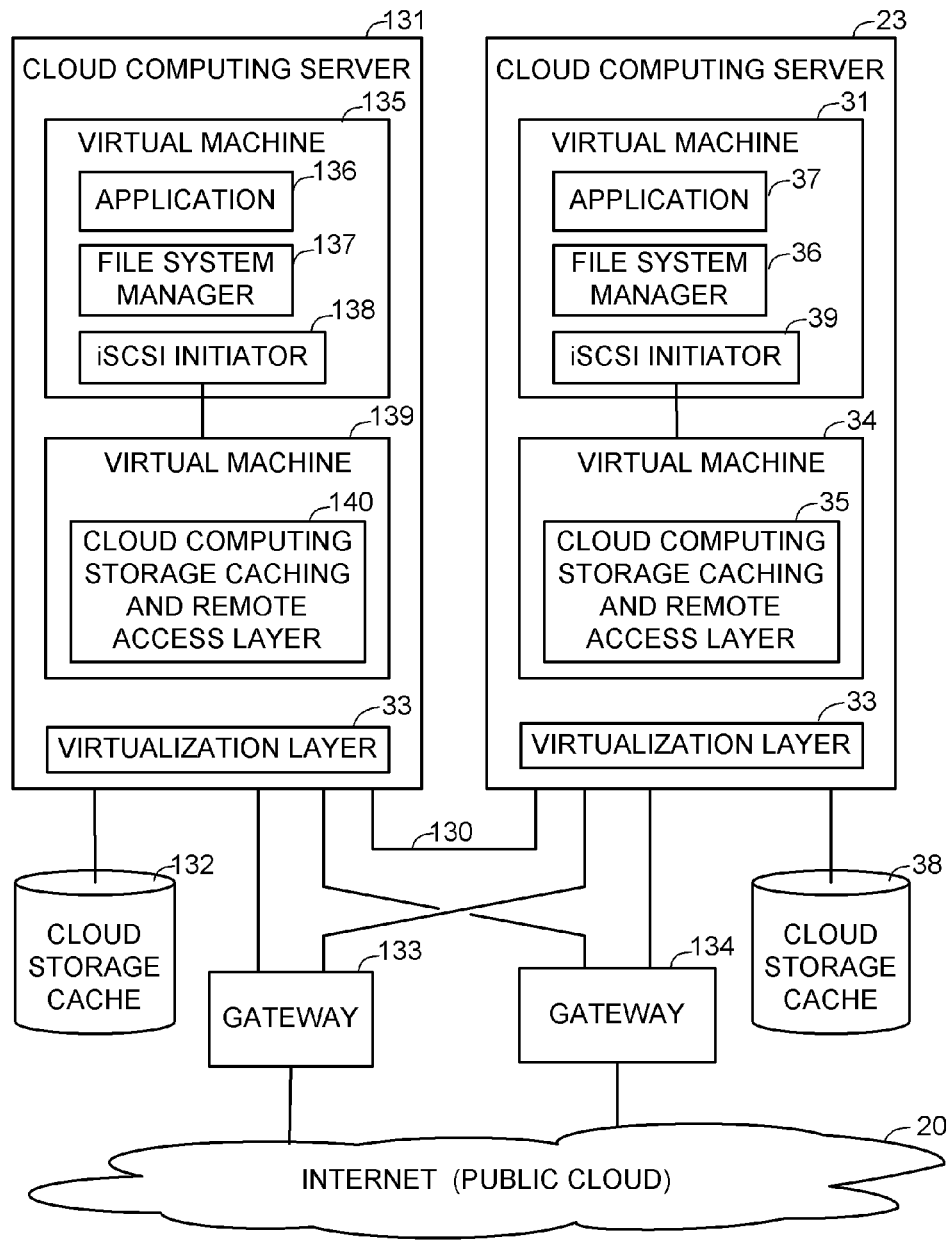
FIG. 5 is a block diagram of a public data center including dual redundant cloud computing servers.

FIG. 5 shows the cloud computing server 23 used in a dual-redundant configuration with a companion cloud computing server 131 forming a public data center. The companion cloud computing server 131 has its own cloud storage cache 132 in storage separate from the storage of the cloud storage cache 38. The two cloud computing servers are linked together by a dedicated data link 130 for mirroring cloud storage cache data so that the temporary information stored in the cloud storage cache 38 is mirrored to the cloud storage cache 132 and the temporary information stored in the cloud storage cache 132 is mirrored to the cloud storage cache 38. The public data center also has dual redundant gateways 133 and 134, each of which provides a separate respective data path between the Internet 20 and each of the cloud computing servers 23, 133.

The cloud computing server 131 has a virtual machine 135 including an application program 136, a file system manager 137, and an iSCSI initiator 138. The cloud computing server 131 also has a virtual machine 139 including a cloud computing storage caching and remote access layer 140. The cloud computing storage caching and remote access layer 140 services SCSI requests from the iSCSI initiator 138 of the virtual machine 136.

In the public data center of FIG. 5, the virtual machine 135 could be a copy of the virtual machine 31. When executed under normal conditions, the virtual machine 135 and the virtual machine 31 could perform similar operations upon separate respective portions of a shared database, while the temporary results of execution in both of the cloud computing servers 131, 23 would be duplicated in each of the cloud storage caches 132, 38. Therefore, if there were a failure of any one of the cloud computing servers 131, 23, the virtual machines in the other cloud computing server could finish the jobs started in the failed cloud computing server using the mirrored copy of the temporary results stored in its cloud storage cache.

Multiple cloud computing servers at a public data center may concurrently execute parallel processes of a multiprocessing Message Passing Interface (MPI) batch job. For example, in this case, each virtual machine for the MPI application includes a LINUX operating system in addition to the MPI application, and intermediate results of the parallel processing are shared between the virtual machines on the multiple cloud computing servers using the MPI protocol.

In general, multiple cloud computing servers in different geographic locations could be synchronized to the private data storage 29 in the enterprise network 26. Each of these cloud computing servers may have multiple applications that access the private data storage 29 via one cloud computing storage caching and remote access layer in the cloud computing server.

Figure 6:
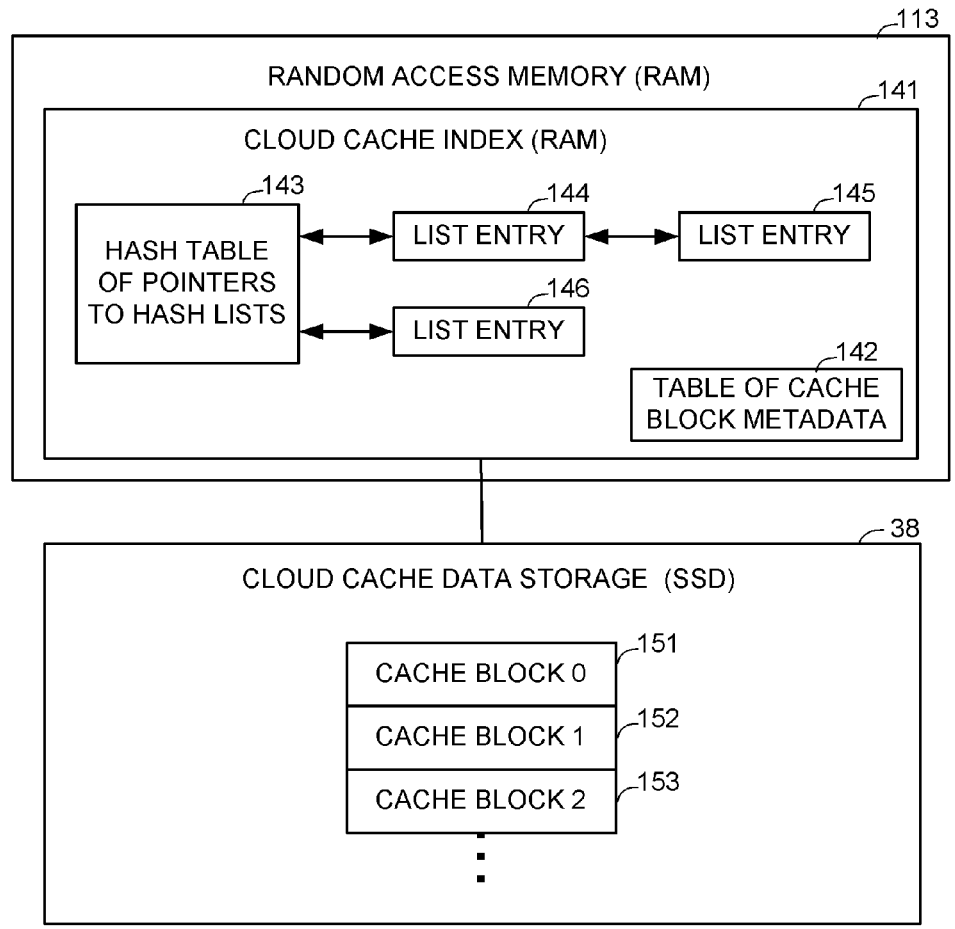
FIG. 6 is a block diagram of a cloud storage cache in solid-state disk (SSD) storage and a cloud cache index in random access memory (RAM)

FIG. 6 shows that the cloud storage cache 38 includes cache blocks 151, 152, 153 in cloud cache data storage provided by solid-state disk storage (SSD). The mapping of the cached SCSI device blocks to the cache blocks 151, 152, 153 is stored in a cloud cache index 141 in the random access memory (RAM) 113 of the cloud computing server. In this fashion, if the cloud cache data storage were stolen or duplicated, the association of the cached SCSI device blocks to the cache blocks would not be discoverable from the information in the cloud cache data storage. Also, it is very easy to flush the random access memory (RAM) 113 in order to erase the mapping of the cached SCSI device blocks from the cloud cache index 141. In any event, the association of cached SCSI device blocks to the application datasets is maintained by the applications themselves and is difficult to ascertain from the cached SCSI device blocks.

The cloud cache index 141 is organized as a table of cache block metadata 142 indexed cache block number. A hash table 143 of hash lists of list entries 144, 145, 146 is provided for quickly searching the table of cache block metadata to find any cache block for a given SCSI target, LUN, and offset in private storage. For example, given a specified SCSI target, LUN, and offset, a hash of the target, LUN, and offset is computed, and the hash table is indexed with the computed hash value. If the indexed hash table entry is zero, then the corresponding hash list is empty, so that the cloud storage cache does not contain a copy of the desired SCSI device block. Otherwise, the indexed hash table entry is a pointer to the first list entry. Each list entry includes a cache block number used for indexing the table of cache block metadata 142. If the indexed entry of cache block metadata contains the specified target, LUN, and offset, then the cache block number is the number of the cache block in the cloud cache data storage 38 containing the desired copy of the specified SCSI device block.

Figure 7:
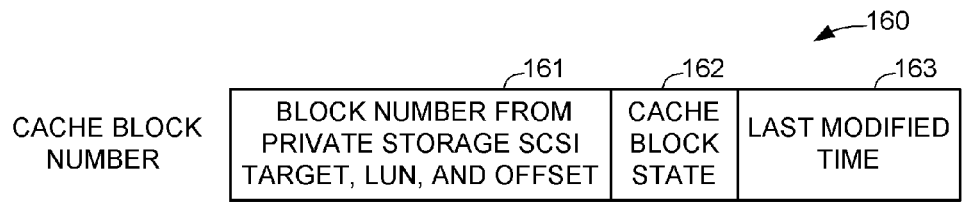
FIG. 7 shows an entry in a table of cache block metadata in the cloud cache index of FIG. 6.

FIG. 7 shows an entry 160 in the table of cache block metadata (142 in FIG. 6). The entry includes a block number 161 formed by concatenating the private storage SCSI target, LUN, and offset. The entry 160 includes a field 162 encoding cache block state, as further described below with reference to FIG. 8. The entry 160 also includes a field 163 containing the time of the last modification of the SCSI device block. The time of last modification of the SCSI device block is used for semi-synchronous write-back to the private data storage or for detecting loss of synchronization when it is desired to maintain synchronization between the cloud storage cache and the private data storage or between the cloud storage cache and copies of the SCSI device blocks in other cloud storage caches. For example, the cloud computing private storage access layer can compare the time of last modification of a write-back device block to the time of last modification of a corresponding device block in the private storage to discard a write-back device block upon finding that the last modification time of the write-back device block is not more recent that the corresponding device block currently in the private data storage.

Figures 8, 10:
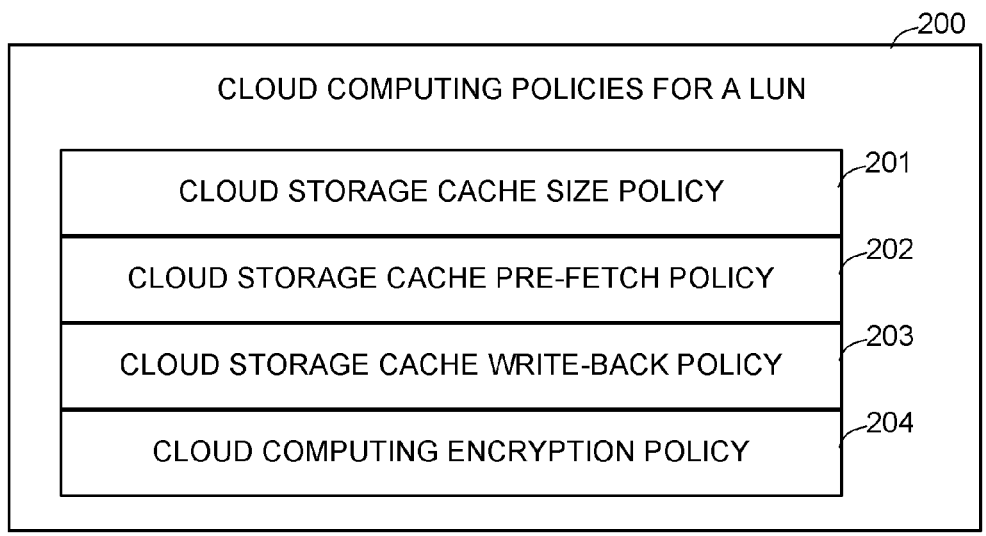
FIG. 8 shows a way of encoding cache block state in the cache block metadata.
FIG. 10 shows various cloud computing policies for a logical unit number (LUN) of storage.

FIG. 8 shows a way of encoding cache block state in the cache block metadata. In this example, each cache block is in one of four possible states, as encoded by two bits. The two bits include a most significant bit (MSB), and a less significant bit (MSB−1). The four possible states include a block invalid state 171, a block valid and clean state 172, a block valid and dirty and not being written back state 173, and a block valid and dirty and being written back state 174.

For example, a cache block is initially in the invalid state 171. When an SCSI device block is copied from the private data storage and written to the cache block, the cache block transitions to the valid and clean state 172. When the application writes to the cache block, the cache block becomes dirty. In a write back mode, when the application writes to the cache block, the cache block transitions to the block valid and dirty and not being written back state 173, and some time later, when the dirty block is written back, the cache block transitions to the block valid and dirty and being written back state 174. In a write thorough mode, when the application writes to the cache block, the cloud computing storage caching and remote access layer also immediately writes the new data to the private storage, so that the cache block transitions to the block valid and dirty and being written back state 174. Once the private storage acknowledges that the new data of a dirty cache block has been written to the private storage, then the cache block transitions back to the block valid and clean state 172.

Figure 9:
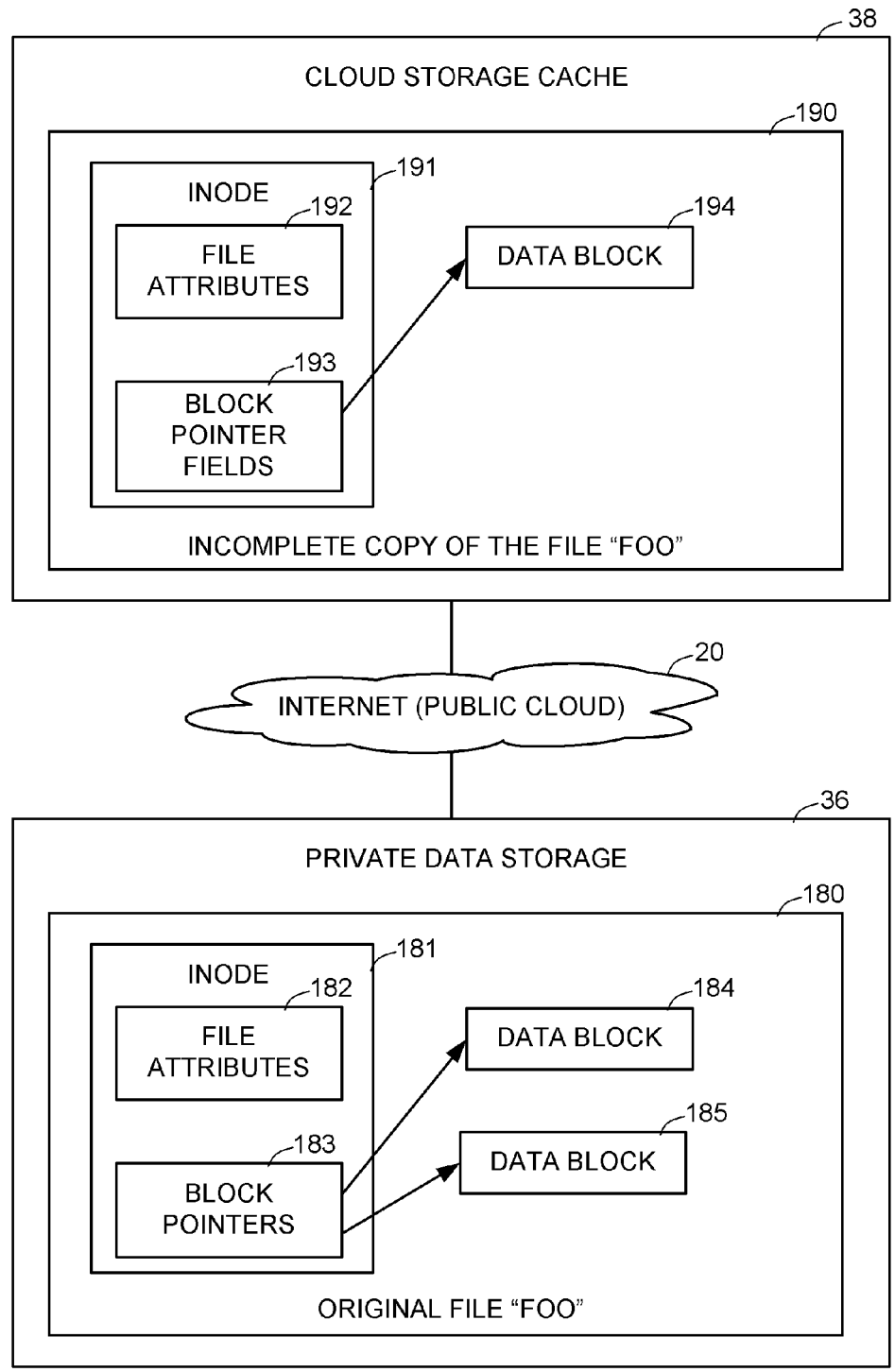
FIG. 9 shows an example of an original file in private storage and an incomplete copy of the file in the cloud storage cache.

FIG. 9 shows an example of an original file 180 in private storage 36 and an incomplete copy 190 of the file in the cloud storage cache 38. In this example, the original file 180 is named "FOO" and has an Mode 181 containing file attributes 182 and block pointers 183 pointing to a first data block 184 and a second data block 185.

For cloud computing, the user agent computer (21 in FIG. 1) sends the virtual machine (31 in FIG. 1) to the cloud computing server (23 in FIG. 1), and then sends a job request to the cloud computing server. The job request is a request for execution of the cloud computing application (37 in FIG. 1), so that the cloud computing server begins execution of the application.

When the application first accesses the file "FOO", the file system manager (36 in FIG. 4) sends to the cloud computing storage caching and remote access layer (34 in FIG. 1) a request for access to the SCSI device block containing the inode 181 for the file "FOO". The cloud computing storage caching and remote access layer finds that a copy of the SCSI device block containing the inode for the file "FOO" is absent from the cloud storage cache 38, so that the cloud computing storage caching and remote access layer fetches a copy of the SCSI device block containing the inode 161 from the private data storage 36, and writes the copy 191 into the cloud storage cache 38. However, at this time, none of the data blocks 184, 185 of the original file "FOO" have been fetched from the private storage 36.

Later, when the application sends a request to read the first data block 184 of the file "FOO" to the file system manager (36 in FIG. 4), the file system manager sends to the cloud computing storage caching and remote access layer (34 in FIG. 1) a request for access to the SCSI device block containing the first data block for the file "FOO". The cloud computing storage caching and remote access layer finds that a copy of the SCSI device block containing the first data block for the file "FOO" is absent from the cloud storage cache 38, so that the cloud computing storage caching and remote access layer fetches a copy of the SCSI device block containing the first data block 184 from the private data storage 36, and writes the copy 194 into the cloud storage cache 38.

In general, it is desired to establish a number of cloud computing policies governing the way that copies of SCSI device blocks are transferred between the private data storage and the cloud storage cache, and maintained in the cloud storage cache, so that the most appropriate policies can be selected for use with a particular cloud computing application.

FIG. 10 shows various kinds of cloud computing policies 200. The policies include a cache size policy 201, a cache pre-fetch policy 202, a cache write-back policy 203, and a cloud storage encryption policy 204.

The cache size policy 201 may set a size limit on a cloud storage cache, and may set a cache block re-use policy such as "least recently used" (LRU) to be used when the number of blocks of the application dataset in the cloud storage cache reaches the size limit.

The cloud storage cache pre-fetch policy 202 may establish when, if ever, a portion of an application dataset will be fetched from the private data storage and written into the cloud storage cache before that portion of the application dataset has actually been requested by the cloud computing application. For example, the default policy is no pre-fetching. Another policy would be to pre-fetch SCSI device blocks as found in a pre-fetch list during a background process. Yet another policy would be to respond to a job request by pre-fetching SCSI device bocks as found in the pre-fetch list, and delaying execution of the cloud computing application until all of the SCSI device blocks on the pre-fetch list have been pre-fetched.

The cloud storage cache write-back policy 203 may establish that the cloud storage cache should keep a record of cache blocks that have become "dirty" (i.e., not synchronized with original SCSI device blocks in the private data storage), and may establish an automatic process for writing the dirty cache blocks back to the private data storage so that the dirty cache blocks become clean.

For example, a default policy is that automatic write-back is not performed, so that the cloud computing application or user agent is responsible for explicitly writing any desired results of the cloud computing back to the private data storage. Such a default policy may be appropriate, for example, when the application generates a specific output file containing all the desired results. Another write-back policy is to maintain a record of the cache blocks that have become "dirty" during a job, and to automatically write back the dirty cache blocks upon the completion of the job.

Yet another write-back policy is to continuously write back the dirty cache blocks in a synchronous, asynchronous, or semi-synchronous fashion, while maintaining not only a record of the cache blocks that have become dirty but also a record of cache blocks that are presently being written back from the cloud storage cache to the private data storage, and also maintaining a "write list" of the cache blocks that are presently dirty. For transaction processing applications, for example, the dirty cache blocks are written back in a semi-synchronous fashion such that the dirty cache blocks at the end of a transaction (as signaled by a "checkpoint" signal from the application) are all written back to the private data storage (together with the "checkpoint" signal) before the application begins processing of a next transaction (upon receipt of a confirmation signal from the server of the private data storage).

The cloud computing encryption policy 184 specifies whether or not the datasets transferred between the private data storage and the cloud storage cache should be encrypted before transmission and transmitted in an encrypted form, and whether or not the datasets stored in the cloud storage cache should be stored in an encrypted form and whether or not the data in the file system cache of the cloud computing server should be stored in an encrypted form. The cloud computing encryption policy may also set expiration time limits on the datasets stored in the cloud storage cache and in the file system cache of the cloud computing server and expiration time limits on the encryption keys. If an expiration time limit is reached, the dataset is deleted from the cloud storage cache or deleted from the file system cache of the cloud computing server, or the encryption key is deleted.

Figure 11:
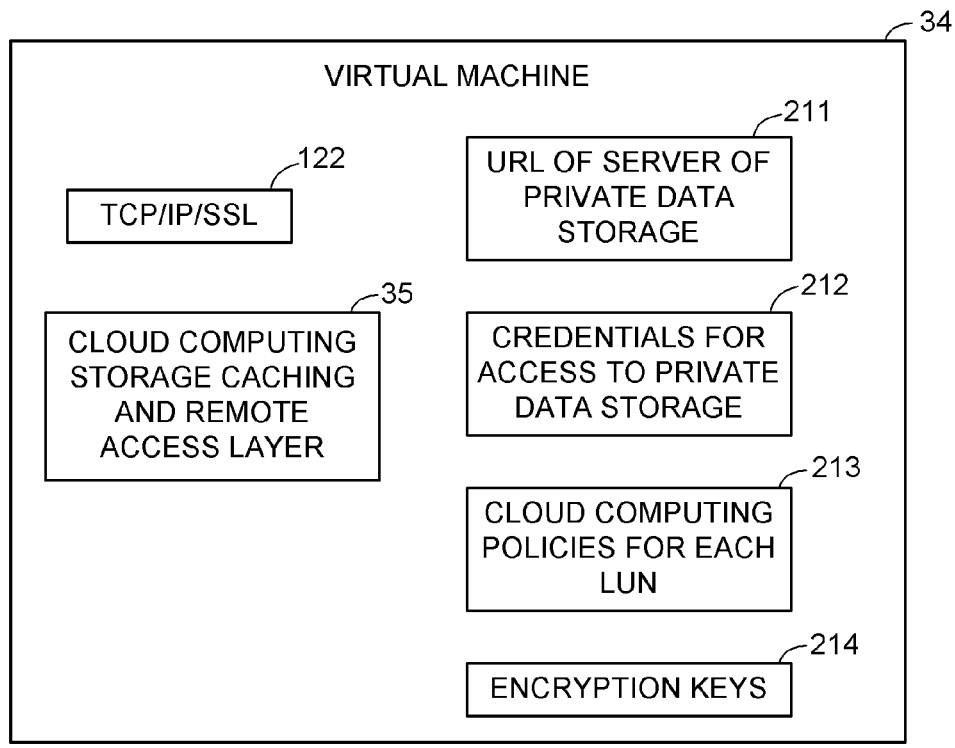
FIG. 11 shows data structures in program memory of a cloud computing server.

FIG. 11 shows additional data structures in the virtual machine (VM) 34 of the cloud computing server (23 in FIG. 1.). The additional data structures include a Universal Resource Locator (URL) 211 of the server of the private data storage, credentials 212 for access to the private data storage, the cloud computing policies 213 for each LUN, and encryption keys 214 when the cloud computing policies specify the use of encryption.

Figure 12:
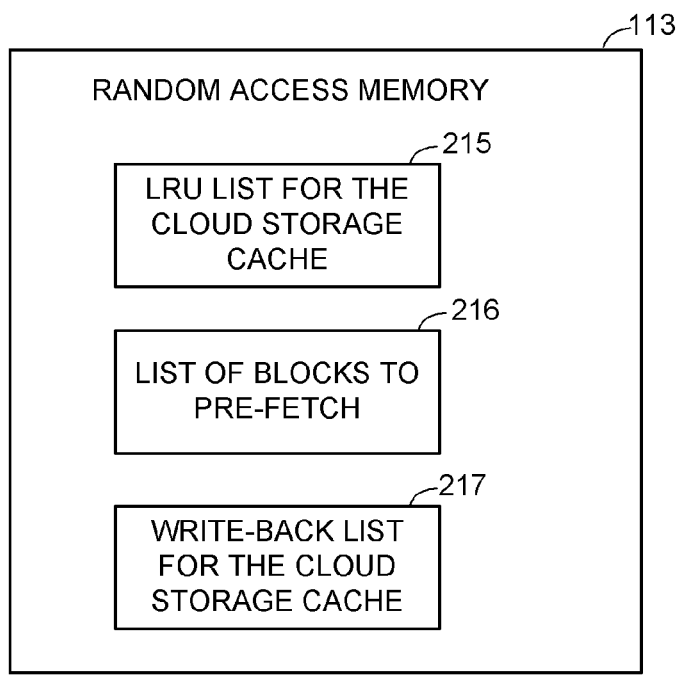
FIG. 12 shows data structures in random access memory of a cloud computing server.

FIG. 12 shows additional data structures that may be used in the random access memory 113 of the cloud computing server in accordance with particular cloud computing policies. The additional data structures include a least recently used (LRU) list 215 for the cloud storage cache if the cloud storage cache size policy specifies that such a LRU list should be maintained for the cloud storage cache. The additional data structures also include a list 216 of SCSI device blocks to pre-fetch if the cloud storage pre-fetch policy specifies that specified SCSI device blocks on such a list should be pre-fetched. The additional data structures further include a write-back list 217 of dirty cache blocks in the cloud storage cache if the cloud storage cache write-back policy specifies that such a write-back list should be maintained.

Figure 13:
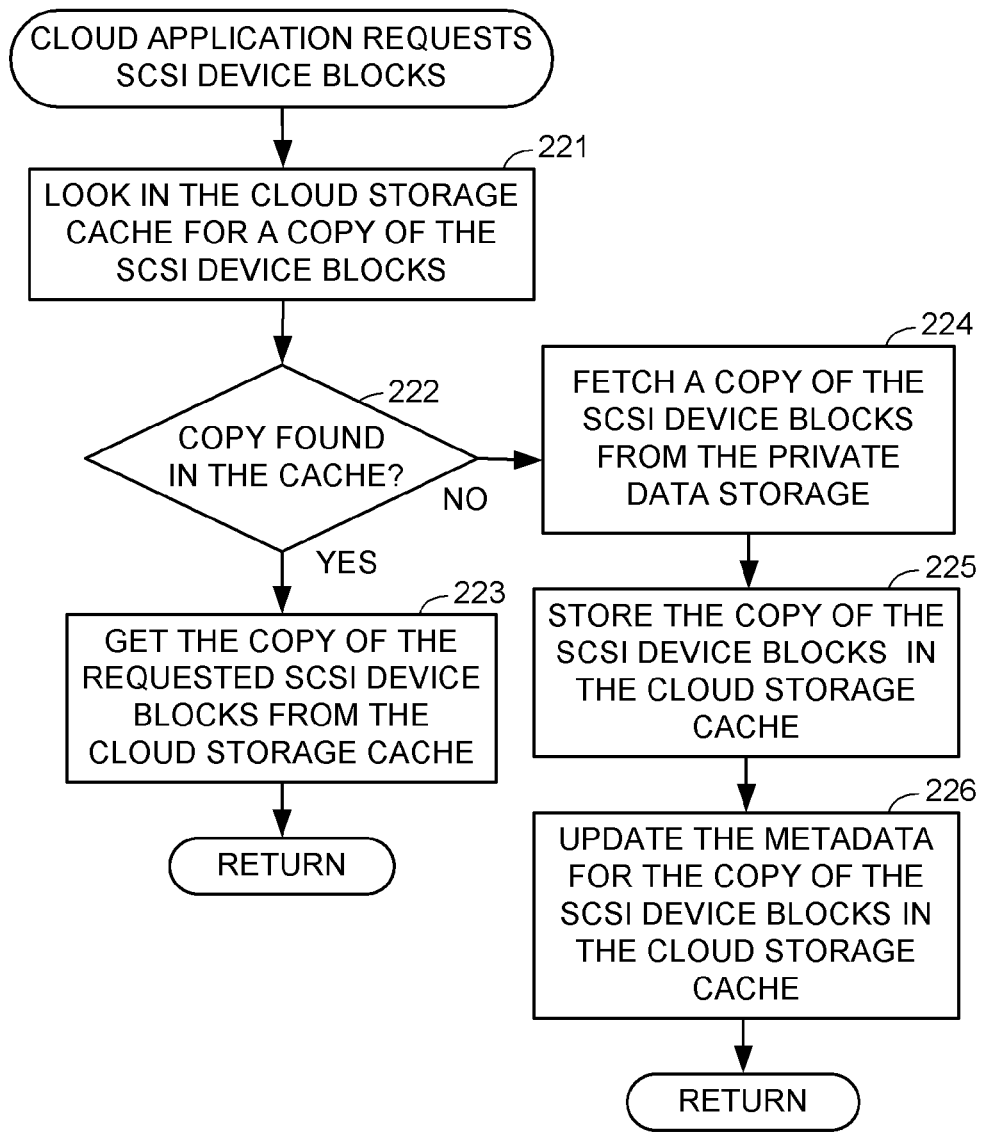
FIG. 13 is a flowchart of a procedure for processing a cloud application request for Small Computer System Interface (SCSI) device blocks.

FIG. 13 shows a procedure for processing a request from a cloud computing application for SCSI device blocks. This procedure is performed by the cloud computing storage caching and remote access layer. In a first step 221, the cloud storage cache is searched to find a copy of the SCSI device blocks. If the copy is found in the cloud storage cache, then execution continues to step 223 to get the copy of the SCSI device blocks from the cloud storage cache, and execution returns.

In step 222, if the copy is not found in the cloud storage cache, then execution branches to step 224 to fetch a copy of the SCSI device blocks from the private data storage. Then, in step 225, the copy of the SCSI device blocks is stored in the cloud storage cache, and in step 226, the cache block metadata for the copy of the SCSI device blocks is updated in the cloud storage cache, and execution returns.

Figure 14:
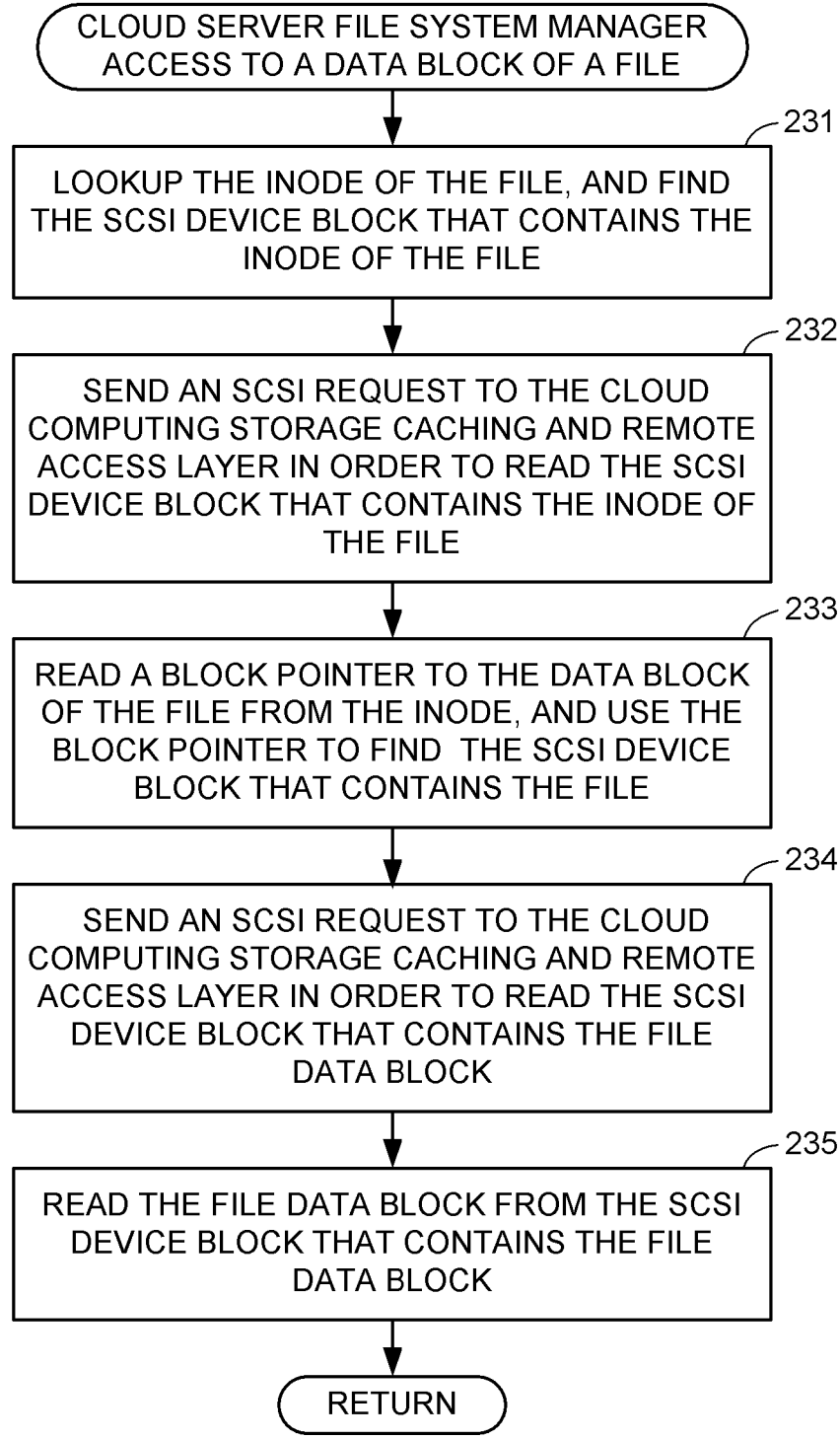
FIG. 14 is a flowchart of a procedure for processing a cloud application request for read or write access to a data block of a file.

FIG. 14 shows a procedure performed by a cloud server file system manager to access a data block of a file. In a first step 231, the file system manager looks up the Mode of the file, and finds the SCSI device block that contains the Mode of the file. Next, in step 232, the file system manager sends an SCSI request to the cloud computing storage caching and remote access layer in order to read the SCSI device block that contains the Mode of the file. In step 233, the file system manager reads a block pointer to the data block of the file from the Mode, and uses the block pointer to find the SCSI device block that contains the file. In step 234, the file system manager sends an SCSI request to the cloud computing storage caching and remote access layer in order to read the SCSI device block that contains the file data block. Finally, in step 235, the file system manager reads the file data from the SCSI device block that contains the file data block, and execution returns.

Figure 15:
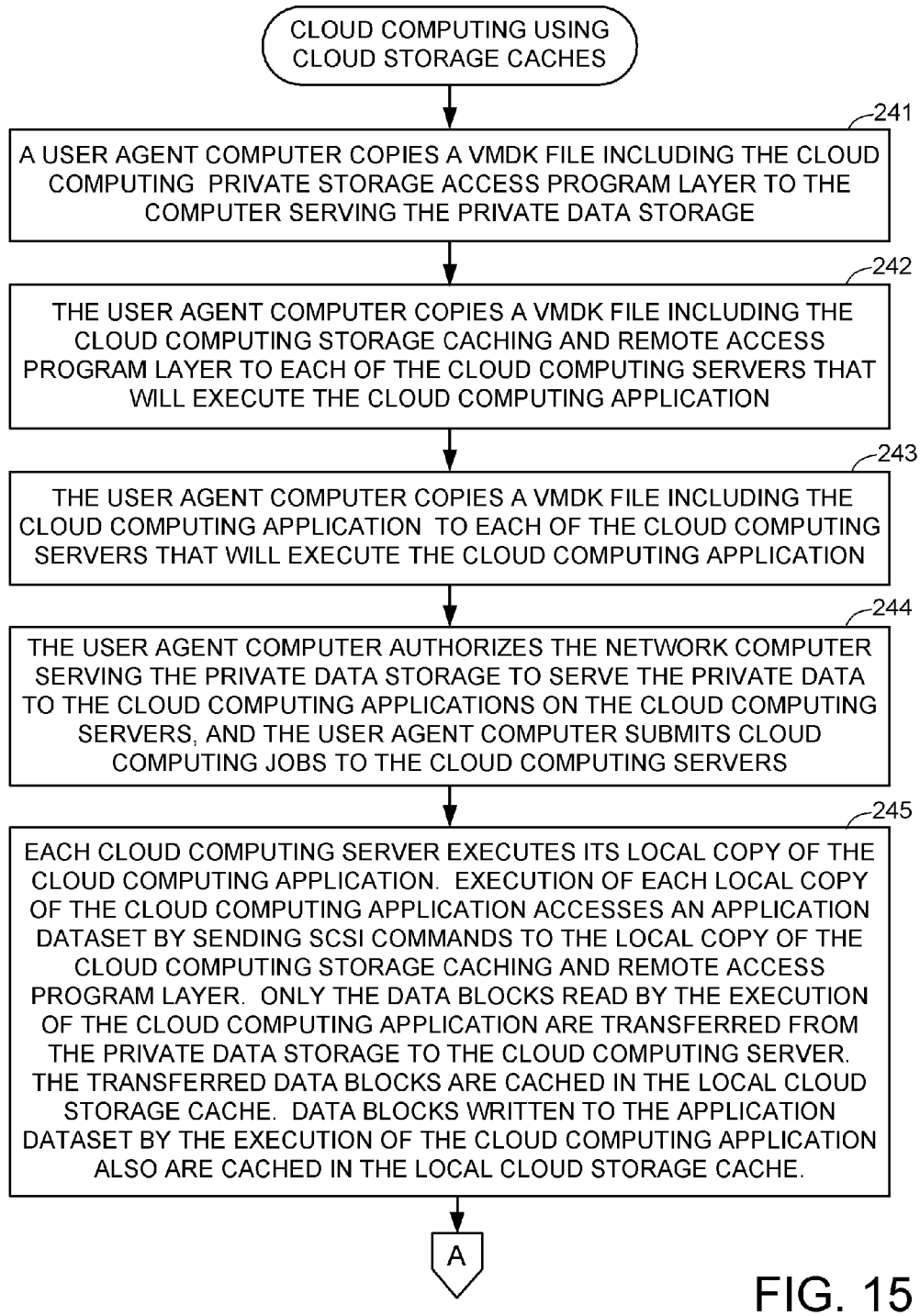
FIGS. 15 and 16 together comprise a flowchart of a procedure for using cloud storage caches for cloud computing.
Figure 16:
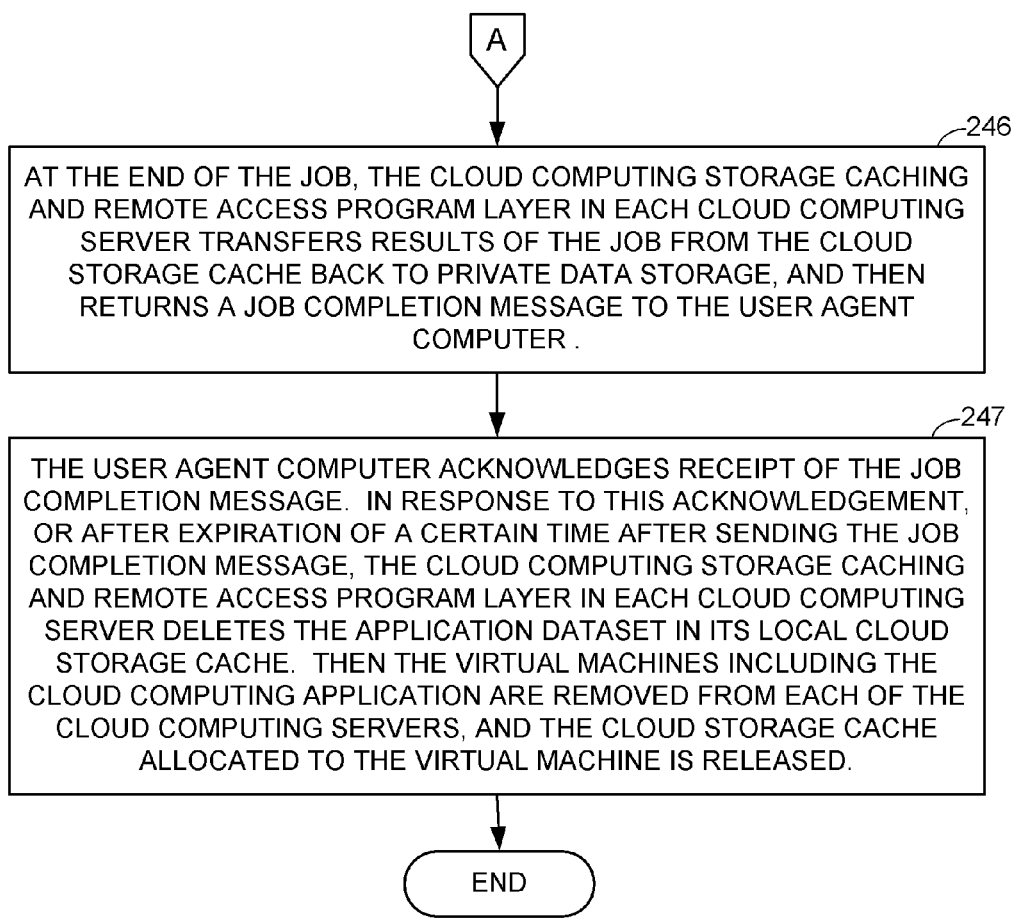

FIGS. 15 and 16 show a procedure for using cloud storage caches for cloud computing. In this example, a user agent computer (such as the user agent computer 21 in FIG. 1) sets up and concurrently runs cloud computing jobs in a number of public cloud computing servers (such as the servers 23 and 24 in FIG. 1) upon datasets from a shared private storage (such as the private storage 28 in FIG. 1).

In a first step 241, the user agent computer copies a VMDK file including the cloud computing private storage access program layer to the network computer (e.g., the storage appliance 27 in FIG. 1) serving the private data storage. Next, in step 242, a user agent computer copies a VMDK file including the cloud computing storage caching and remote access program layer to each of the cloud computing servers that will execute concurrently the cloud computing application. Then, in step 243, the user agent computer copies a VMDK file including the cloud computing application to each of the cloud computing servers that will execute the cloud computing application.

In general, a VMDK file includes an application program and an operating system (such as the LINUX operating system or the Microsoft Corporation WINDOWS operating system) that is compatible with the application program. The VMDK file could be copied from the private data storage or from a public library of VMDK files.

Once a cloud computing private storage access program layer has been installed in a network storage server computer of the private storage, and a cloud computing storage caching and remote access layer has been installed in a cloud computing server, the cloud computing storage caching and remote access layer could be invoked in the cloud computing server to copy the VMDK file of an application from the private storage to the cloud computing server. In this case, it would also be possible for the computer cloud computing storage caching and remote access layer to copy blocks of the VMDK file to the cloud computing server only when these blocks are actually needed for execution of the application program.

In step 244, the user agent computer authorizes the network computer serving the private data storage to serve the private data to the cloud computing applications on the cloud computing servers, so that a link is established and synchronized between the private data storage and the virtual machines on the cloud computing servers, and the user agent submits cloud computing jobs to the cloud computing servers.

In step 245, in response to the job request from the user agent, each cloud computing server executes its local copy of the cloud computing application. Execution of each local copy of the cloud computing application accesses an application dataset by sending SCSI commands to the local copy of the cloud computing storage caching and remote access program layer. Only the data blocks read by the execution of the cloud computing application are transferred from the private data storage to the cloud computing server. The transferred data blocks are cached in the local cloud storage cache. Data blocks written to the application dataset by the execution of the cloud computing application also are cached in the local cloud storage cache.

In step 246 of FIG. 16, at the end of the job, the cloud computing storage caching and remote access program layer in each cloud computing server transfers results of the job from the cloud storage cache back to private data storage, and then returns a job completion message to the user agent computer. In step 247, the user agent computer acknowledges receipt of the job completion message. In response to this acknowledgement, or after expiration of a certain time after sending the job completion message, the cloud computing program layer deletes the application datasets in the cloud storage cache. Then the virtual machine including the cloud computing application is removed from each of the cloud computing servers, and the cloud storage cache allocated to the virtual machine is released.

The procedure in FIGS. 15 and 16 can be repeated to perform multiple cycles of distributed transactions. For example, "before" and "after" images of the results returned by each of the cloud computing servers in a single cycle (as shown in FIGS. 15 and 16) can be recorded in a respective transaction log in the storage appliance. If a particular cloud computing server does not give complete or consistent results, then the results of that particular cloud computing server can be aborted (and the transaction log used to "undo" partial or possibly corrupt results of that particular cloud computing server) and the job of that particular cloud computing server can be re-run on a different cloud computing server. Once all of the cloud computing servers have given complete and consistent results, another cycle is performed. For enhanced security, new encryption keys can be distributed for the jobs of the next cycle, and the VMDK files and the jobs for the next cycle can be sent to an entirely different group of public cloud computing servers.

In view of the above, there have been described a method, system, and non-transitory computer-readable storage medium for executing an application in a public cloud without moving a private dataset of the application to the public cloud. The application is included in a virtual machine sent to a cloud computing server in the public cloud. The cloud computing server includes a remote access layer that fetches data blocks of the private dataset of the application from private data storage as the data blocks are requested by the application, so that the application in the public cloud begins execution without waiting for the entire application dataset to be transferred to the public cloud, and the data blocks are transferred from the private dataset to the public cloud only when the data blocks are accessed by the application. The application's private data is kept in the public cloud only when it is currently being used so that the load of the network is distributed in time for better utilization of network resources. If there are security concerns, the application's private data is transferred over the public network in an encrypted form and stored in the public cloud in an encrypted form.

The method can be used by individual human users who keep the application private data on a hard drive of a personal computer linked to the Internet, as well as enterprise users who keep application private data in network servers in a secure enterprise network. In either case, private data storage is separated from the public cloud computing services, jobs are run in the public cloud without unwarranted data transfer delay, and application private data is not available to the virtual machines of other users of the public cloud computing services. Thus, cloud computing jobs can be run at any public location with reduced data exposure.

What is claimed is:

1. A method of executing an application program in a public cloud network without moving a private dataset of the application program from private data storage to the public cloud network, the method comprising a data processor of a cloud computing server in the public cloud network executing computer instructions stored on a non-transitory computer readable storage medium of the cloud computing server to perform the steps of:

a) loading a virtual machine onto the non-transitory computer readable storage medium, the virtual machine including the application program, and the non-transitory computer readable storage medium also storing a cloud computing storage remote access program layer for remote access over the public cloud network to the private dataset; and b) executing the application program with the data processor to access data blocks of the private dataset by invoking the cloud computing remote access layer, and in response to the execution of the application program invoking the cloud computing remote access layer, executing the cloud computing remote access layer to fetch the data blocks from the private dataset by remote access over the public cloud network to the private dataset, so that the execution of the application program with the data processor accesses the data blocks of the private dataset without waiting for the entire application dataset to be transferred to the public cloud network, and the data blocks of the private dataset are transferred from the private dataset to the cloud computing server only when the data blocks of the private dataset are accessed by the execution of the application program;

which further includes a user agent computer copying a Virtual Machine Disk Format file including the virtual machine to the cloud computing server, the user agent computer authorizing a storage appliance to permit remote access of the cloud computing server to the private dataset in the private data storage, the user agent computer sending a job request to the cloud computing server, the data processor of the cloud computing server executing the application program in response to the job request, and the cloud computing server deleting the virtual machine and any local copies of data of the private dataset upon completion of the execution of the application program in response to the job request.

2. The method as claimed in claim 1, which further includes loading a private virtual machine onto a private server computer that is separate from the cloud computing server and that maintains the private dataset in the private data storage, the private virtual machine including a cloud computing private storage access program layer executed to communicate with the cloud computing storage remote access program layer during the remote access over the public cloud network to the private dataset by fetching the data blocks from the private dataset and sending the fetched data blocks to the cloud computing storage remote access program layer.

3. The method as claimed in claim 1, wherein the cloud computing remote access layer is included in a virtual machine separate from the virtual machine that includes the application program, and the method further includes the virtual machine that includes the application program sending Internet Protocol Small Computer System Interface (iSCSI) commands to the virtual machine that includes the cloud computing remote access layer in order to access data blocks of the private dataset by invoking the cloud computing remote access layer.

4. The method as claimed in claim 1, which further includes the execution of the cloud computing remote access layer maintaining, in data storage of the cloud computing server, a cloud storage cache of copies of the data blocks of the private dataset that have been accessed by the execution of the application program.

5. The method as claimed in claim 4, wherein the cloud storage cache includes a cloud cache index in random access memory, and cloud cache data storage in solid-state disk storage, and which further includes the execution of the cloud computing remote access layer storing the copies of the data blocks of the private dataset in the cloud cache data storage, and storing cache block metadata in the cloud cache index in the random access memory so that the cache block mapping metadata is not stored in the solid-state disk storage, and the cache block metadata mapping data blocks of the private data storage to cache blocks of the cloud cache data storage in the solid-state disk storage.

6. The method as claimed in claim 4, which further includes the execution of the cloud computing remote access layer writing back results of the execution of the application program from the cloud storage cache to the private dataset in the private data storage.

7. The method as claimed in claim 4, which further includes storing, in the non-transitory computer readable storage medium, a cloud storage cache size policy, a cloud storage cache write-back policy, and a cloud computing encryption policy, and the execution of the cloud computing remote access layer allocates storage of the cloud computing server to the cloud storage cache in accordance with the cloud storage cache size policy, and writes back results of the execution of the application program from the cloud storage cache to the private dataset in the private data storage in accordance with the cloud storage cache write-back policy, and encrypts and decrypts data blocks accessed by the execution of the application program in accordance with the cloud computing encryption policy, wherein the cloud storage cache write-back policy specifies that the cloud storage cache keeps a record of cache blocks that are not synchronized with blocks in the private data storage, and the record of the cache blocks that are not synchronized is used to write the cache blocks that are not synchronized back to the private dataset, and the encryption policy specifies that datasets stored in the cloud storage cache are stored in an encrypted form.

8. A data processing system comprising a cloud computing server, the cloud computing server including a data processor, a network adapter for linking the data processor to a public cloud network for remote access to private data storage remote from the cloud computing server, and a non-transitory computer readable storage medium coupled to the data processor for execution of computer instructions stored on the non-transitory computer readable storage medium, and the computer instructions, when executed by the data processor, performing a method of executing an application program in the cloud computing server without moving a private dataset of the application program from the private data storage to the public cloud network, the method including the steps of:

a) loading a virtual machine onto the non-transitory computer readable storage medium, the virtual machine including the application program, and the non-transitory readable storage medium also storing a cloud computing storage remote access program layer for remote access over the public cloud network to the private dataset; and b) executing the application program with the data processor to access data blocks of the private dataset by invoking the cloud computing remote access layer, and in response to the execution of the application program invoking the cloud computing remote access layer, executing the cloud computing remote access layer to fetch the data blocks from the private dataset by remote access over the public cloud network to the private dataset, so that the execution of the application program with the data processor accesses the data blocks of the private dataset without waiting for the entire application dataset to be transferred to the public cloud network, and the data blocks of the private dataset are transferred from the private dataset to the cloud computing server only when the data blocks of the private dataset are accessed by the execution of the application program;

wherein the computer instructions, when executed by the data processor of the cloud computing server, further perform the steps of receiving, from a user agent computer, a Virtual Machine Disk Format file including the virtual machine, and receiving a job request from the user agent computer, and the data processor of the cloud computing server executing the application program in response to the job request, and the cloud computing server deleting the virtual machine and any local copies of data of the private dataset upon completion of the execution of the application program in response to the job request.

9. The data processing system as claimed in claim 8, which further includes a private storage appliance that is separate from the cloud computing server, the storage appliance linking the private data storage to the public cloud network, the storage appliance including a data processor and a non-transitory computer storage medium storing a private virtual machine that, when executed by the data processor of the storage appliance, maintains the private dataset in the private data storage, the private virtual machine including a cloud computing private storage access program layer executed to communicate with the cloud computing storage remote access program layer during the remote access over the public cloud network to the private dataset by fetching the data blocks from the private dataset and sending the fetched data blocks to the cloud computing storage remote access program layer.

10. The data processing system as claimed in claim 8, wherein the cloud computing remote access layer is included in a virtual machine separate from the virtual machine that includes the application program, and the computer instructions, when executed by the data processor, send Internet Protocol Small Computer System Interface (iSCSI) commands from the virtual machine that includes the application program to the virtual machine that includes the cloud computing remote access layer in order to access data blocks of the private dataset by invoking the cloud computing remote access layer.

11. The data processing system as claimed in claim 8, wherein the cloud computing remote access program layer, when executed by the data processor of the cloud computing server, maintains a cloud storage cache of copies of the data blocks of the private dataset that have been accessed by the execution of the application program.

12. The data processing system as claimed in claim 11, wherein the cloud storage cache includes a cloud cache index in random access memory, and cloud cache data storage in solid-state disk storage, and the cloud computing remote access program layer, when executed by the data processor of the cloud computing server, stores the copies of the data blocks of the private dataset in the cloud cache data storage, and stores cache block metadata in the cloud cache index in the random access memory so that the cache block mapping metadata is not stored in the solid-state disk storage, the cache block metadata mapping data blocks of the private data storage to cache blocks of the cloud cache data storage in the solid-state disk storage.

13. The data processing system as claimed in claim 11, wherein the cloud computing remote access program layer, when executed by the data processor of the cloud computing server, writes back results of the execution of the application program from the cloud storage cache to the private dataset in the private data storage.

14. The data processing system as claimed in claim 11, wherein the non-transitory computer readable storage medium stores a cloud storage cache size policy, a cloud storage cache write-back policy, and a cloud computing encryption policy, and the cloud computing remote access layer, when executed by the data processor of the cloud computing server, allocates storage of the cloud computing server to the cloud storage cache in accordance with the cloud storage cache size policy, and writes back results of the execution of the application program from the cloud storage cache to the private dataset in the private data storage in accordance with the cloud storage cache write-back policy, and encrypts and decrypts data blocks accessed by the execution of the application program in accordance with the cloud computing encryption policy, and the cloud storage cache write-back policy specifies that the cloud storage cache keeps a record of cache blocks that are not synchronized with blocks in the private data storage, and the record of the cache blocks that are not synchronized is used to write the cache blocks that are not synchronized back to the private dataset, and the encryption policy specifies that datasets stored in the cloud storage cache are stored in an encrypted form.

15. A non-transitory computer readable storage medium storing computer instructions that, when executed by a data processor of a cloud computing server in a public cloud network, perform a method of executing an application program in the cloud computing server without moving a private dataset of the application program from private data storage to the public cloud network, the method including the steps of:
   a) loading a virtual machine onto the non-transitory computer readable storage medium, the virtual machine including the application program, and the non-transitory computer readable storage medium also storing a cloud computing storage remote access program layer for remote access over the public cloud network to the private dataset; and
   b) executing the application program with the data processor to access data blocks of the private dataset by invoking the cloud computing remote access layer, and in response to the execution of the application program invoking the cloud computing remote access layer, executing the cloud computing remote access layer to fetch the data blocks from the private dataset by remote access over the public cloud network to the private dataset, so that the execution of the application program with the data processor accesses the data blocks of the private dataset without waiting for the entire application dataset to be transferred to the public cloud network, and the data blocks of the private dataset are transferred from the private dataset to the cloud computing server only when the data blocks of the private dataset are accessed by the execution of the application program;
   wherein the instructions, when executed by the data processor of the cloud computing server, further perform the steps of receiving, from a user agent computer, a Virtual Machine Disk Format file including the virtual machine, and receiving a job request from the user agent computer, and the data processor of the cloud computing server executing the application program in response to the job request, and the cloud computing server deleting the virtual machine and any local copies of data of the private dataset upon completion of the execution of the application program in response to the job request.

16. The non-transitory computer readable storage medium as claimed in claim 15, wherein the cloud computing remote access program layer, when executed by the data processor of the cloud computing server, maintains a cloud storage cache of copies of the data blocks of the private dataset that have been accessed by the execution of the application program, and
   wherein the cloud storage cache includes a cloud cache index in random access memory, and cloud cache data storage in solid-state disk storage, and which further includes the execution of the cloud computing remote access layer storing the copies of the data blocks of the private dataset in the cloud cache data storage, and storing cache block metadata in the cloud cache index in the random access memory so that the cache block mapping metadata is not stored in the solid-state disk storage, and the cache block metadata mapping data blocks of the private data storage to cache blocks of the cloud cache data storage in the solid-state disk storage.

17. The non-transitory computer readable storage medium as claimed in claim 16, wherein the non-transitory computer readable storage medium stores a cloud storage cache size policy, a cloud storage cache write-back policy, and a cloud computing encryption policy, and the cloud computing remote access layer, when executed by the data processor of the cloud computing server, allocates storage of the cloud computing server to the cloud storage cache in accordance with the cloud storage cache size policy, and writes back results of the execution of the application program from the cloud storage cache to the private dataset in the private data storage in accordance with the cloud storage cache write-back policy, and encrypts and decrypts data blocks accessed by the execution of the application program in accordance with the cloud computing encryption policy, wherein the cloud storage cache write-back policy specifies that the cloud storage cache keeps a record of cache blocks that are not synchronized with blocks in the private data storage, and the record of the cache blocks that are not synchronized is used to write the cache blocks that are not synchronized back to the private dataset, and the encryption policy specifies that datasets stored in the cloud storage cache are stored in an encrypted form.

* * * * *